Jan. 12, 1926.                                                                        1,569,529
E. ANDERSON
APPARATUS FOR ELECTRICAL SEPARATION OF SUSPENDED MATERIAL FROM GASES
Filed April 13, 1925          2 Sheets-Sheet 1
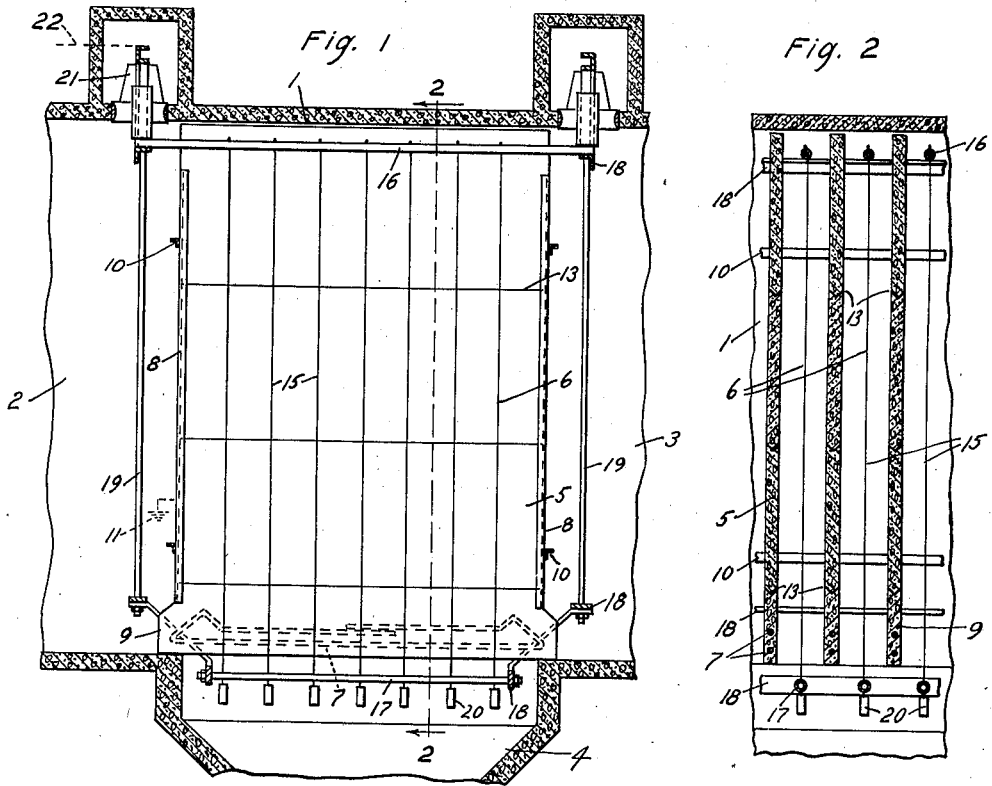
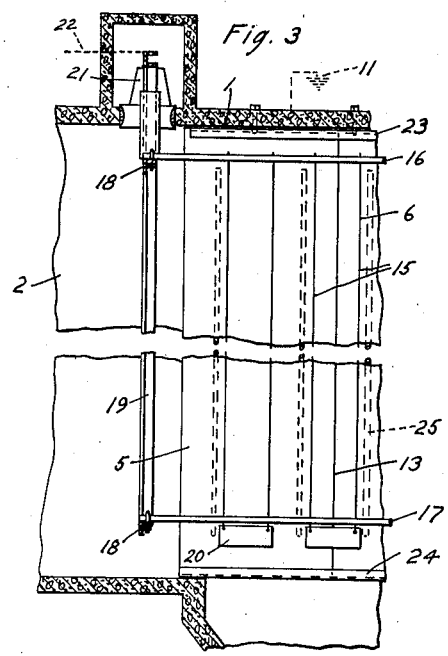
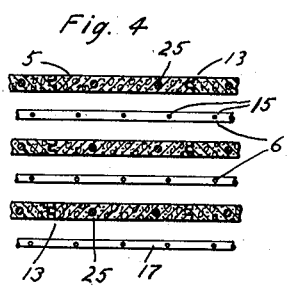
INVENTOR.
Evald Anderson
BY
ATTORNEY.

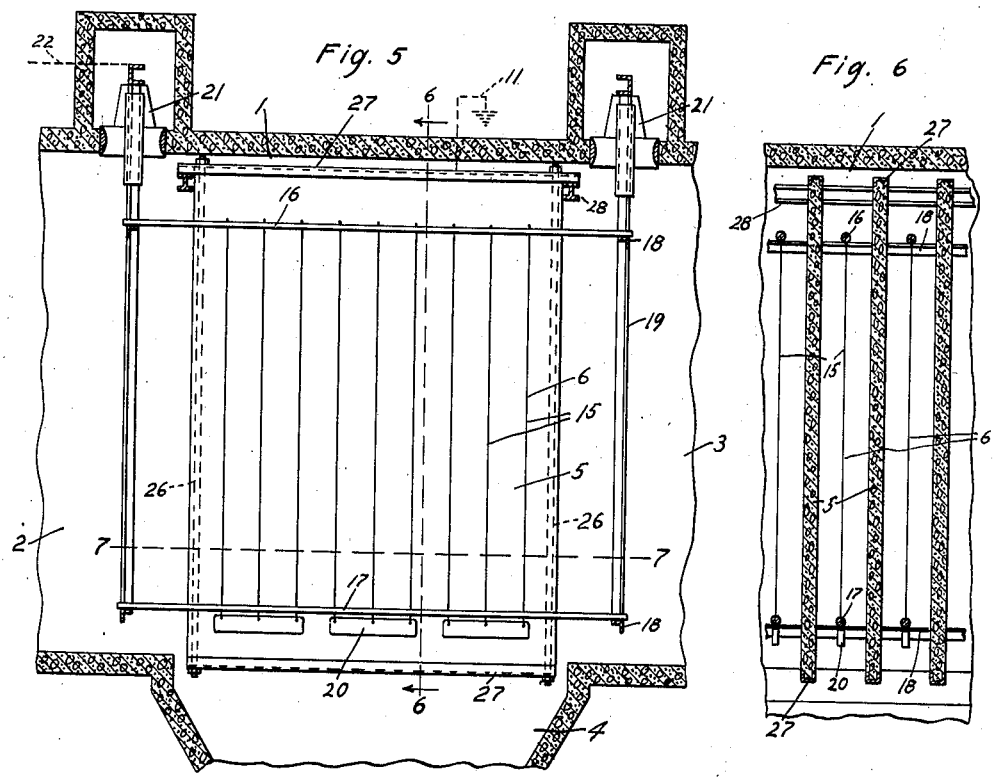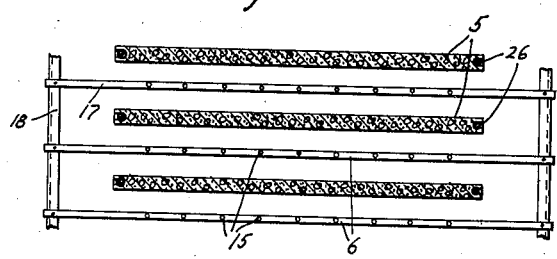

Patented Jan. 12, 1926.

1,569,529

UNITED STATES PATENT OFFICE.

EVALD ANDERSON, OF ALHAMBRA, CALIFORNIA, ASSIGNOR TO INTERNATIONAL PRECIPITATION COMPANY, OF LOS ANGELES, CALIFORNIA, A CORPORATION OF CALIFORNIA.

APPARATUS FOR ELECTRICAL SEPARATION OF SUSPENDED MATERIAL FROM GASES.

Application filed April 13, 1925. Serial No. 22,846.

*To all whom it may concern:*

Be it known that I, EVALD ANDERSON, a citizen of the United States, residing at Alhambra, county of Los Angeles, State of California, have invented a new and useful Apparatus for Electrical Separation of Suspended Material from Gases, of which the following is a specification.

This invention relates to means for electrical precipitation of suspended material such as dust, fume, etc., from gases containing same and the main object of the invention is to provide improved means for this purpose which will operate effectively and which will be reliable and economical in construction.

The accompanying drawings illustrate my invention and referring thereto:

Fig. 1 is a longitudinal section of an electrical precipitator embodying my invention.

Fig. 2 is a partial transverse section on line 2—2 in Fig. 1.

Fig. 3 is a longitudinal section of another form of my invention.

Fig. 4 is a partial horizontal section of the form shown in Fig. 3.

Fig. 5 is a longitudinal section of another form of my invention.

Fig. 6 is a partial transverse section on line 6—6 in Fig. 5.

Fig. 7 is a partial horizontal section on line 7—7 in Fig. 5.

Referring to Figs. 1 and 2, the electrical precipitator therein shown comprises a flue or chamber 1, the walls of which may be of any suitable material for example concrete, and which is provided with inlet means 2 and outlet means 3 for the gases and with means such as hopper 4 for receiving the precipitated material.

A plurality of electrodes are arranged in the flue or chamber 1, such electrodes comprising collecting electrodes 5 and discharge electrodes 6. Each collecting electrode consists of a plate formed of a body or bodies of semi-conducting or high resistance material such as Portland cement concrete, plaster or plaster composition, terra-cotta, transite, or similar materials, which is mounted in and supported by a suitable frame, said frame comprising grounded metallic parts which serve to distribute the current to or from the collecting electrode without presenting any grounded metallic or conducting members in the body of the electrode. Said frame may comprise for example vertical steel bars 8 which are grounded as indicated at 11 and are supported by horizontal supports 10 extending across the chamber 1, and which serve as lateral supporting means as well as grounding means for the electrode means 5. The electrode means 5 may be made in a plurality of sections as shown in Figs. 1 and 2 said sections being separated by joints 13 which may be tongue and groove or V construction so as to interlock the plates and said joints may be cemented by Portland cement grout so as to form the several members of the electrode into one rigid body. The bottom section 9 of the collecting electrode may be formed as a reinforced concrete beam, the steel reinforcement 7 being embedded in the concrete or semi-conducting body 5 and being separated by concrete from any grounded metal parts, such as the side bars 8, so that such reinforcing means is ungrounded. Said bottom member 9 may rest on the base of flue or chamber 1, and serves to support the upper sections of the electrode 5.

Each discharge electrode 6 may comprise a plurality of vertically extending wires, bars or rods 15 constituting electrode members of relatively limited area as compared with the area of the collecting electrodes, the said discharge electrode members 15 being arranged in rows between successive collecting electrodes 5, each row of discharge electrode members being supported for example by a horizontal top beam 16 and a horizontal lower spacing beam 17 which may be mounted upon suitable supporting frames comprising horizontal bars 18 and vertical bars 19 so as to form a rigid metallic frame for each discharge electrode, the members 15 of each discharge electrode being mounted on and suspended from the top bar 16 and extending through and spaced by the lower bar 17 and being tensioned by suitable means such as weights 20 at their lower ends in case tensioning is necessary. In case rods or bars are used for said electrode members no tensioning means are required. The supporting frames for the discharge electrodes are mounted in any suitable manner on insulating supports 21. The respective discharge electrode members 15 extend opposite the collecting electrode body 8 and by reason of the construction of said collecting electrode body there are no grounded metallic members between or opposite the respective discharge electrode members 15, so that there is no possibility of disruptive discharge or arcing from any part of any discharge electrode to an opposing part of a collecting electrode, the resistance of the semiconducting body of the collecting electrode being sufficiently high to prevent such disruptive discharge and to permit only sufficient current to flow to effect the precipitating operation. With the described construction it will be understood that the supporting bars 16 and 17 for the high tension or discharge electrode members will not in general pass or be opposite to the metallic or conducting supporting bars 8 for the collecting electrode at any portions thereof, and moreover these supporting members are made of relatively large area and are free from sharp angles which would present high electrical field intensity so that there is no appreciable amount of discharge therefrom.

It will be understood that in some cases it may be desirable to incorporate with the semi-conducting body of the collecting electrodes, material for increasing its conductivity such for example as iron oxide or carbon (crushed coke, etc.) but in any case I prefer to make the collecting electrode body substantially wholly of semi-conducting material, said term being herein defined as limiting the construction of the electrode to exclude the presence of grounded metallic or other conductors, such as wires or rods extending in the collecting electrode.

In operation the discharge electrode system above described is connected by wire indicated at 22 to any suitable source of high tension current either alternating or direct, but preferably rectified alternating high tension current, said source being adapted to maintain a potential difference between the discharge electrodes and the grounded collecting electrodes of from say 15,000 to 100,000 volts according to the spacing of the electrodes and other conditions. By reason of the relatively limited area and sharp curvature of the discharge electrodes a silent electrical discharge is produced therefrom. The conductivity of the semi-conducting collecting electrodes is sufficient to maintain the potential of all parts of the same at substantially that of the ground so that a substantially uniform potential difference exists between the respective discharge electrodes and the opposing parts of the collecting electrodes, resulting in silent discharge as stated and in precipitation of the suspended material in the gases on the electrodes, particularly on the collecting electrodes. The amount of current involved in such electrical precipitation by reason of the ionization of the gases and electrical precipitating operation is generally so small that the grounded collecting electrodes are able to transmit such current notwithstanding the high resistance of the material of which they are composed, and the fact that there are no grounded metallic members opposite any metal parts acting as discharge electrodes prevents formation of a disruptive discharge or arcing between any part of the discharge electrode and the opposing part of the collecting electrodes.

The gas to be treated is passed through the chamber 1 so as to flow between the discharge elements and the collecting electrodes. The material precipitated on the electrodes by the action of the electrical field eventually falls off of the same by gravity and is collected at the bottom of the precipitator. If desired the collecting electrodes may be jarred from time to time, to dislodge deposited material therefrom, but it has been found that with semi-conducting electrodes such as above described the deposited material adheres only slightly to the collecting electrodes and falls off before it becomes thick enough to seriously impair the effectiveness of the precipitator.

In the form of my invention shown in Figs. 3 and 4 the joints between the sections of the collecting electrodes 5 are shown as extending vertically, the construction being otherwise as above described. In this case however the grounding of the respective sections of the collecting electrode is effected by contact thereof with top and bottom metal bars such as channel irons 23 and 24 which are mounted in any suitable manner and are supported within the flue or chamber 1 so as to rigidly support the respective collecting electrodes. In these figures I have also illustrated imbedded reinforcements in the sections of the collecting electrode, said reinforcements consisting for example of steel bars 25 which are imbedded in the concrete or other high resistance material of the electrode but are not grounded or in contact with any metal part of the supporting frame.

As shown in Figs. 5 to 7 each collecting electrode 5 may consist of a monolithic member supported in a frame consisting of vertical bars 26 and horizontal beams 27, said bars 26 being for example steel rods and beams 27 being for example steel channels. In this case the metal frame members 26 and 27 are grounded as indicated at 11 and serve to distribute current to or from the body of the collecting electrode at each edge thereof, thereby providing for effective distribution of current without presenting any metal members opposite the discharge electrode members 15. The supporting frames for the collecting electrodes may in this case be mounted or supported on horizontal bars or beams 28 extending across the chamber 1 and supported in any suitable manner.

An important feature of my invention above described is that every part of each collecting electrode is in contact through the high resistance material of the electrode with a grounded conductor, such collecting electrode being formed of one or more continuous members of semi-conducting material which are in contact only at the edges thereof with a part of the metal supporting frame. Furthermore every part of a collecting electrode which is opposite a discharge electrode is ungrounded by reason of the fact that it does not contain any metallic conductor which is in metallic or low resistance connection with the ground, the metallic supporting and grounding means being outside of the effective field of action of the discharge electrodes. In those cases where metallic reinforcements are present in the collecting electrode such reinforcements are ungrounded as they are disconnected from the supporting and grounding means so that the above features of my invention and the advantages thereof heretofore described apply also in the case of such reinforced electrode members.

While I have shown, in each of the forms of construction above described, discharge electrodes comprising vertically extending members, it will be understod that any of the collecting electrode constructions shown may also be used in connection with horizontal discharge wires or rods. In such cases, suitable modifications may be made in the construction so as to maintain the above described relation between the discharge electrode members and the metallic grounding and supporting means for the collecting electrodes.

I claim:

1. A collecting electrode for electrical precipitators comprising a body of high resistance material and grounded metallic supporting and grounding frame means in contact with but wholly outside of said body, the construction being such that a continuous electrical connection is established from every part of the collecting electrode to the said supporting and grounding means through the high resistance material of said electrodes.

2. A collecting electrode for electrical precipitators comprising grounded metallic supporting and grounding means and a body of high resistance material in contact with and supported by said supporting and grounding means, the construction being such that a continuous electrical connection is established from every part of the collecting electrode to the said supporting and grounding means through the high resistance material of said electrodes, and said collecting electrode containing ungrounded metallic reinforcing means which are disconnected electrically from the metallic supporting and grounding means.

3. In an electrical precipitator the combination with a discharge electrode, of a collecting electrode opposing the same and having a relatively extended surface as compared with the discharge electrode, said collecting electrode comprising conducting frame means and a body of semi-conducting material in contact with said frame means at its edges only and supported thereby, the parts of said electrode body which are opposite the discharge electrode being ungrounded and connected to the said grounding and supporting means solely through the high resistance material of the collecting electrode body itself.

4. In an electrical precipitator in combination with discharge electrodes, collecting electrodes opposite the discharge electrodes, each collecting electrode comprising a metallic supporting and grounding means and a collecting electrode body of semi-conducting material in contact with and supported by said supporting and grounding means and comprising a plurality of sections held together and electrically connected by said supporting and grounding means, said supporting and grounding means being outside of the electrical field of action of the discharge electrodes and the portions of the collecting electrodes which are opposed to the electrical field of action of the discharge electrode being in electrical connection with said grounding means solely through the high resistance material of the said collecting electrode body.

In testimony whereof I have hereunto subscribed my name this 12th day of March, 1925.

EVALD ANDERSON.